Patented Dec. 19, 1922.

1,439,624

UNITED STATES PATENT OFFICE.

ADOLF FELDT, OF FRANKFORT-ON-THE-MAIN, GERMANY, ASSIGNOR TO FARBWERKE VORM. MEISTER LUCIUS & BRÜNING, OF HOCHST-ON-THE-MAIN, GERMANY, A CORPORATION OF GERMANY.

COMPLEX AMINOARGENTOMERCAPTOBENZENECARBOXYLIC ACID AND PROCESS OF MAKING SAME.

No Drawing. Application filed June 30, 1922. Serial No. 572,041.

*To all whom it may concern:*

Be it known that I, ADOLF FELDT, a citizen of Germany, residing at Frankfort-on-the-Main, Germany, have invented certain new and useful Improvements in a Complex Aminoargentomercaptobenzenecarboxylic Acid and Process of Making Same (for which I have made application in Germany Feb. 12, 1920), of which the following is a specification.

It is known (see Berichte 45, 1912, page 1734) that by causing a silver salt to act upon an amino-body which contains an acid group, a hydrogen atom of the amino-group is exchanged for a silver atom.

In contradistinction thereto I have found that by causing the 4-amino-2-mercaptobenzene-1-carboxylic acid to react with a silver salt, not the amino-group but the sulfhydryl group enters into reaction, which is proved by the facts that the product thus obtained readily dissolves in concentrated hydrochloric acid and can then be diazotized and combined with R-salt. Likewise by treating the product with formaldehyde bisulphite it is condensed to the N-methyl-sulphurous acid. As moreover the reaction of the ammonium salt of the acid with silver salts occurs in exactly the same manner as when the free acid is used, it is also proved that the silver salt does not undergo any reaction with the hydrogen atom of the carboxyl group.

The 4-amino-2-mercaptobenzene-1-carboxylic acid, which can be obtained by diazotizing 4-nitro-2-aminobenzene-1-carboxylic acid, transforming the diazo-compound with potassium sulphocyanide in presence of cuprous sulphocyanide into the nitrosulphocyanide of benzene-carboxylic acid and treating the latter with a reducing agent, is a colorless powder which dissolves with difficulty in water but readily in dilute acids and alkalies. The acid melts at 205° C.

The amino-argentomercaptobenzenecarboxylic acid obtained by the new process is applied, advantageously in the form of its alkali salts, with an excellent efficacy in the treatment of diseases caused by bacteria.

The following example illustrates my invention:

17 grams of 4-amino-2-mercaptobenzene-1-carboxylic acid are dissolved in a mixture of 300 cc. of acetone and 200 cc. of water and there are added, while stirring, 50 cc. of concentrated ammonia, whereupon a solution of 7 grams of silver acetate in 100 cc. of spirit and 25 cc. of ammonia is run into the whole.

After the mass has been allowed to stand for two hours, it is filtered, the filtrate is run into a mixture of 1 litre of spirit and 1 litre of acetone, the precipitate is filtered and washed with water. The product is then dissolved in 500 cc. of water with addition of 100 cc. of concentrated ammonia; then the liquid is filtered and acidified with dilute hydrochloric acid; the light-yellow 4-amino-2-argentomercaptobenzene-1-carboxylic acid which separates is filtered under pressure, washed with water, then with spirit and ether and dried. The analysis shows a content of 42 per cent of silver. If the 4-amino-2-argentomercaptobenzene-1-carboxylic acid is heated with an excess of alkali, silver oxid separates and from the filtrate the 4-amino-2-mercaptobenzene-1-carboxylic acid is again obtained by acidification.

Instead of silver acetate there may be used other silver salts, such as silver chloride in ammonical solution, silver fluoride and silver nitrate, for the preparation of the silver compound.

Having now particularly described my invention what I claim is:

1. As a new product, a complex amino-argentomercaptobenzene carboxylic acid of excellent therapeutic efficacy in the treatment of diseases caused by bacteria, the empiric constitution of which corresponds to the formula:

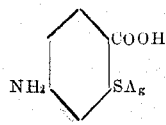

and which is obtainable by causing a silver salt to act upon 4-amino-2-mercaptobenzene-1-carboxylic acid; being a colorless powder, difficultly soluble in water, readily soluble in dilute acids and alkalies and melting at 205° C.

2. The herein described process of preparing a complex aminoargentomercaptobenzenecarboxylic acid which consists in causing a silver salt to react upon 4-amino-2-mercaptobenzene-1-carboxylic acid.

In testimony whereof, I affix my signature.

ADOLF FELDT.